US012808378B2

(12) United States Patent
Konishi

(10) Patent No.: US 12,808,378 B2
(45) Date of Patent: Nov. 24, 2026

(54) COMPRESSOR

(71) Applicant: DAIKIN INDUSTRIES, LTD., Osaka (JP)

(72) Inventor: Kenta Konishi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 19/181,082

(22) Filed: Apr. 16, 2025

(65) Prior Publication Data

US 2026/0160253 A1 Jun. 11, 2026

Related U.S. Application Data

(63) Continuation of application No. PCT/JP2023/031675, filed on Aug. 31, 2023.

(30) Foreign Application Priority Data

Oct. 20, 2022 (JP) ................................ 2022-168543

(51) Int. Cl.
*F04C 29/04* (2006.01)
*F04C 23/02* (2006.01)
*H02K 9/14* (2006.01)

(52) U.S. Cl.
CPC ............ *F04C 29/045* (2013.01); *F04C 23/02* (2013.01); *F04C 2240/40* (2013.01); *H02K 9/14* (2013.01)

(58) Field of Classification Search
CPC .... F04C 29/045; F04C 23/02; F04C 2240/40; H02K 9/14
See application file for complete search history.

(56) References Cited

U.S. PATENT DOCUMENTS 6,042,346 A * 3/2000 Doi ........................ F04C 23/008 418/55.6
2012/0189470 A1* 7/2012 Okaichi ................ F04C 29/023 417/321

(Continued)

FOREIGN PATENT DOCUMENTS

JP 2009-299663 A 12/2009
JP 2013-117188 A 6/2013

(Continued)

OTHER PUBLICATIONS

International Preliminary Report of corresponding PCT Application No. PCT/JP2023/031675 dated May 1, 2025.

(Continued)

*Primary Examiner* — Hoang M Nguyen
(74) *Attorney, Agent, or Firm* — Spencer Fane LLP

(57) ABSTRACT

A compressor includes a closed container, a motor, and a compression mechanism arranged below the motor in the closed container and configured to be driven by the motor to compress a refrigerant The motor has a rotor arranged in the closed container and provided on a shaft extending in an up-down direction, and a stator fixed to the closed container. The compressor has a circulation amount of 1000 (kg/hr) or more in an operation at a maximum number of revolutions. The stator includes a stator core provided with a core cut serving as a passage of the refrigerant between an inner wall of the closed container and the stator. In the compressor, (pressure loss that occurs between an inlet and an outlet of the core cut)/(a gas density of the refrigerant−a density of a lubricant) is 1.45 or less.

6 Claims, 11 Drawing Sheets

(56) References Cited

U.S. PATENT DOCUMENTS

| | | | | |
|---|---|---|---|---|
| 2016/0040672 | A1 | 2/2016 | Lee et al. | |
| 2021/0340981 | A1* | 11/2021 | Okamoto .............. | F25B 31/004 |
| 2023/0160383 | A1 | 5/2023 | Ohnishi et al. | |
| 2023/0318368 | A1* | 10/2023 | Nigo ..................... | F25B 31/026<br>310/40 R |
| 2023/0417461 | A1 | 12/2023 | Ueda et al. | |

FOREIGN PATENT DOCUMENTS

| | | | |
|---|---|---|---|
| JP | 2021-17849 | A | 2/2021 |
| JP | 2022-13732 | A | 1/2022 |
| JP | 2022-142561 | A | 9/2022 |
| WO | 2022/004288 | A1 | 1/2022 |

OTHER PUBLICATIONS

International Search Report of corresponding PCT Application No. PCT/JP2023/031675 dated Oct. 24, 2023.

European Search Report of corresponding EP Application No. 23 87 9486.1 dated Oct. 31, 2025.

* cited by examiner

COMPRESSOR

CROSS-REFERENCE TO RELATED APPLICATIONS

This is a continuation of International Application No. PCT/JP2023/031675 filed on Aug. 31, 2023, which claims priority under 35 U.S.C. § 119(a) to Patent Application No. 2022-168543, filed in Japan on Oct. 20, 2022, all of which are hereby expressly incorporated by reference into the present application.

BACKGROUND

Technical Field

The present disclosure relates to a compressor.

Background Information

Compressors for compressing refrigerant have been known. Japanese Unexamined Patent Publication No. 2009-299663 discloses a rotary compressor. The rotary compressor is configured as a hermetic compressor having a dome-shaped casing in which a compression mechanism and a motor are accommodated. The motor includes a stator fixed to the barrel of the casing and a rotor disposed inside the stator and connected with the drive shaft.

SUMMARY

A first aspect of the present disclosure is a compressor including a closed container, a motor, and a compression mechanism, and having a circulation amount of 1000 (kg/hr) or more in an operation at a maximum number of revolutions. The motor is arranged in the closed container. The motor has a rotor on a shaft extending in an up-down direction and a stator fixed to the closed container. The compression mechanism is arranged below the motor in the closed container. The compression mechanism is driven by the motor and compresses a refrigerant. The stator includes a stator core provided with a core cut serving as a passage of the refrigerant between an inner wall of the closed container and the stator. In the compressor, (the pressure loss that occurs between an inlet and an outlet of the core cut)/(a gas density of the refrigerant-a density of a lubricant) is 1.45 or less.

DETAILED DESCRIPTION OF EMBODIMENT(S)

Hereinafter, embodiments of the present disclosure will be described with reference to the drawings. The embodiments below are merely exemplary ones in nature, and are not intended to limit the scope, applications, or use of the invention.

Configuration of Compressor

Figure 1:
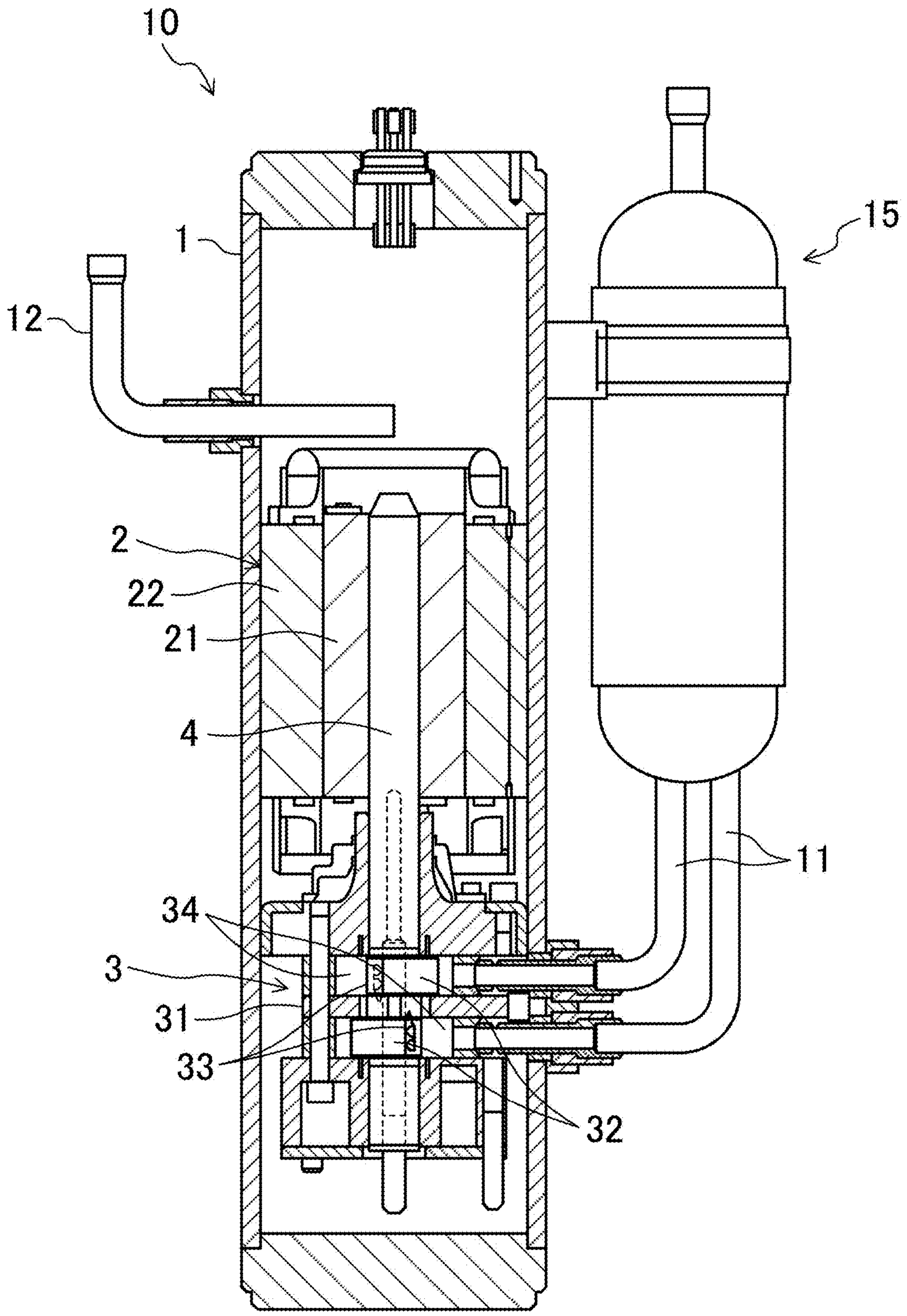
FIG. 1 is a longitudinal cross-sectional view of a compressor of an embodiment.

As illustrated in FIG. 1, a compressor (10) of the present embodiment includes a closed container (1), a motor (2), and a compression mechanism (3) as main components. The circulation amount at the maximum number of revolutions of the compressor (10) is 1000 (kg/hr) or more. In the present embodiment, a rotary compressor is illustrated as the compressor (10), but the compressor to which the technology described in the present embodiment is applied is not limited to the rotary compressor. The technology described in the present embodiment is applicable to compressors other than the rotary compressor.

The motor (2) is arranged in the closed container (1). The motor (2) has a rotor (21) on a shaft (4) extending in the up-down direction and a stator (22) fixed to the closed container (1).

The compression mechanism (3) is arranged below the motor (2) in the closed container (1). The compression mechanism (3) is driven by the motor (2) and compresses a refrigerant.

One end of each suction pipe (11) is connected to the compression mechanism (3) in a lower lateral portion of the closed container (1). The other end of each suction pipe (11) is connected to an accumulator (15) placed adjacent to the closed container (1). A refrigerant gas (low-pressure refrigerant) supplied to the compressor (10) through the suction pipe (11) via the accumulator (15) is guided to the suction side of the compression mechanism (3). In this example, the compression mechanism (3) has a two-stage configuration, with two suction pipes (11) connected to the cylinders of the respective stages.

A discharge pipe (12) is connected to an upper space above the motor (2) in the closed container (1). A refrigerant gas (high-pressure refrigerant) compressed by the compression mechanism (3) is discharged from the discharge pipe (12). The suction pipes (11) and the discharge pipe (12) pass through the closed container (1) and are fixed to the closed container (1) so that the closed container (1) is gastight. The closed container (1) is gastight except the suction pipes (11) and the discharge pipe (12) communicate with the outside of the closed container (1).

An oil reservoir is provided in a lower space below the compression mechanism (3) in the closed container (1) to store the lubricant that lubricates driving sections of the compression mechanism (3). The lubricant is refrigerating machine oil used to increase the lubricity at sliding portions in the internal space of the closed container (1).

The compression mechanism (3) includes a cylindrical body (31). The shaft (4) is inserted in the body (31). The shaft (4) is rotatably supported by bearings provided at the upper and lower ends of the compression mechanism (3). Crank pins (32) are provided for the shaft (4) in the body (31). In the compression mechanism (3), a compression chamber (34) for compressing a refrigerant is formed between pistons (33) fitted to and driven by the crank pins (32) and the body (31). The pistons (33) rotate or orbit eccentrically with respect to the axis of the shaft (4) and change the volume of the compression chamber (34). The refrigerant gas is thereby compressed.

The motor (2) drives the compression mechanism (3) via the shaft (4). The motor (2) is arranged in a high-pressure area in the closed container (1) filled with a high-pressure refrigerant gas discharged from the compression mechanism (3). The motor (2) includes the columnar rotor (21) fixed on the shaft (4) and the stator (22) opposed to the rotor (21) in the radial direction of the rotor (21) with an air gap interposed therebetween. The rotor (21) has a rotor core configured with a plurality of metal plates stacked in the up-down direction, and magnets are embedded in the rotor core. The stator (22) is a cylindrical member fixed to the inner wall of the closed container (1).

Stator

Figure 2:
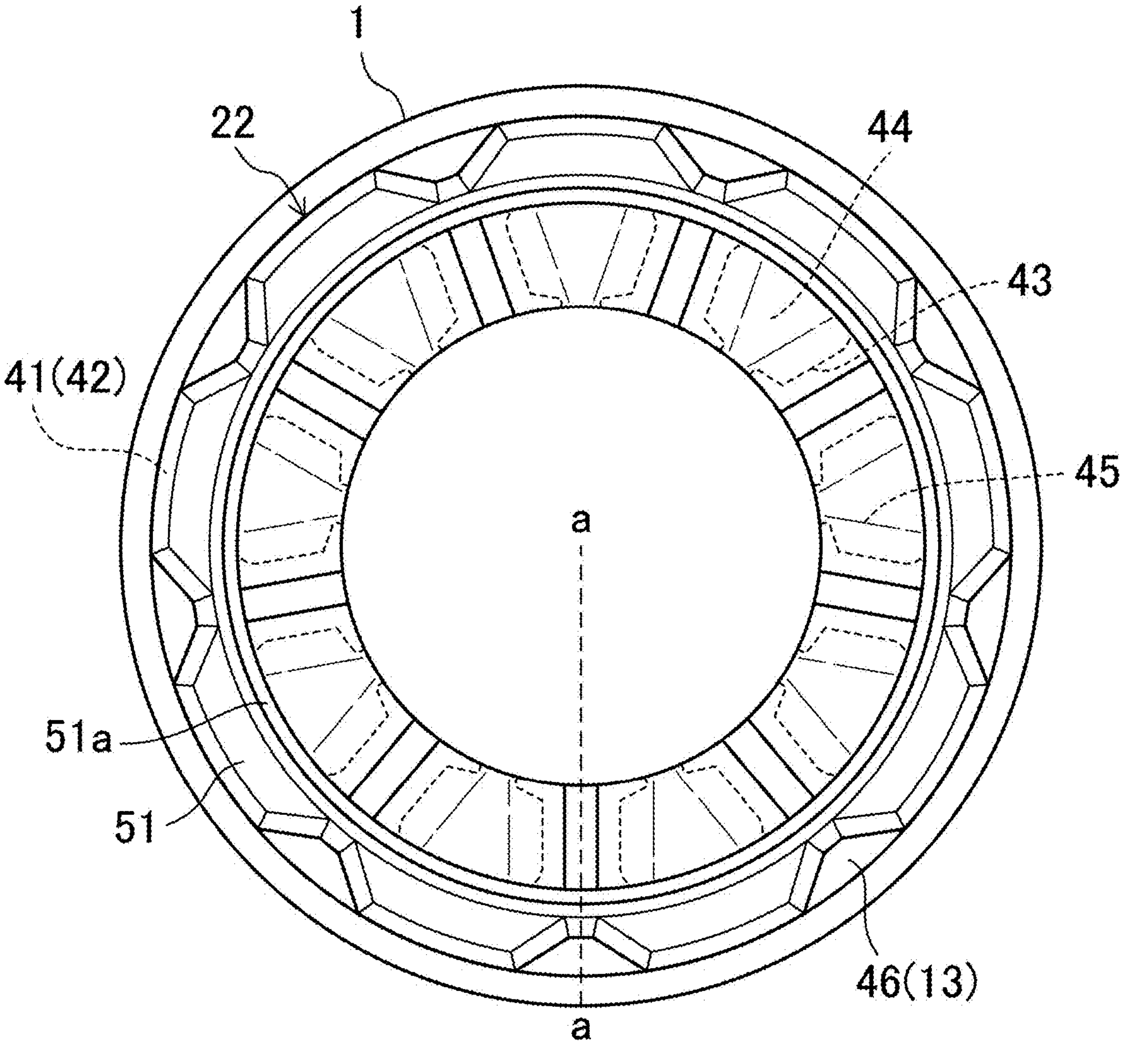
FIG. 2 is a cross-sectional view illustrating an arrangement configuration of a closed container and a stator of the compressor of the embodiment.
Figure 3:
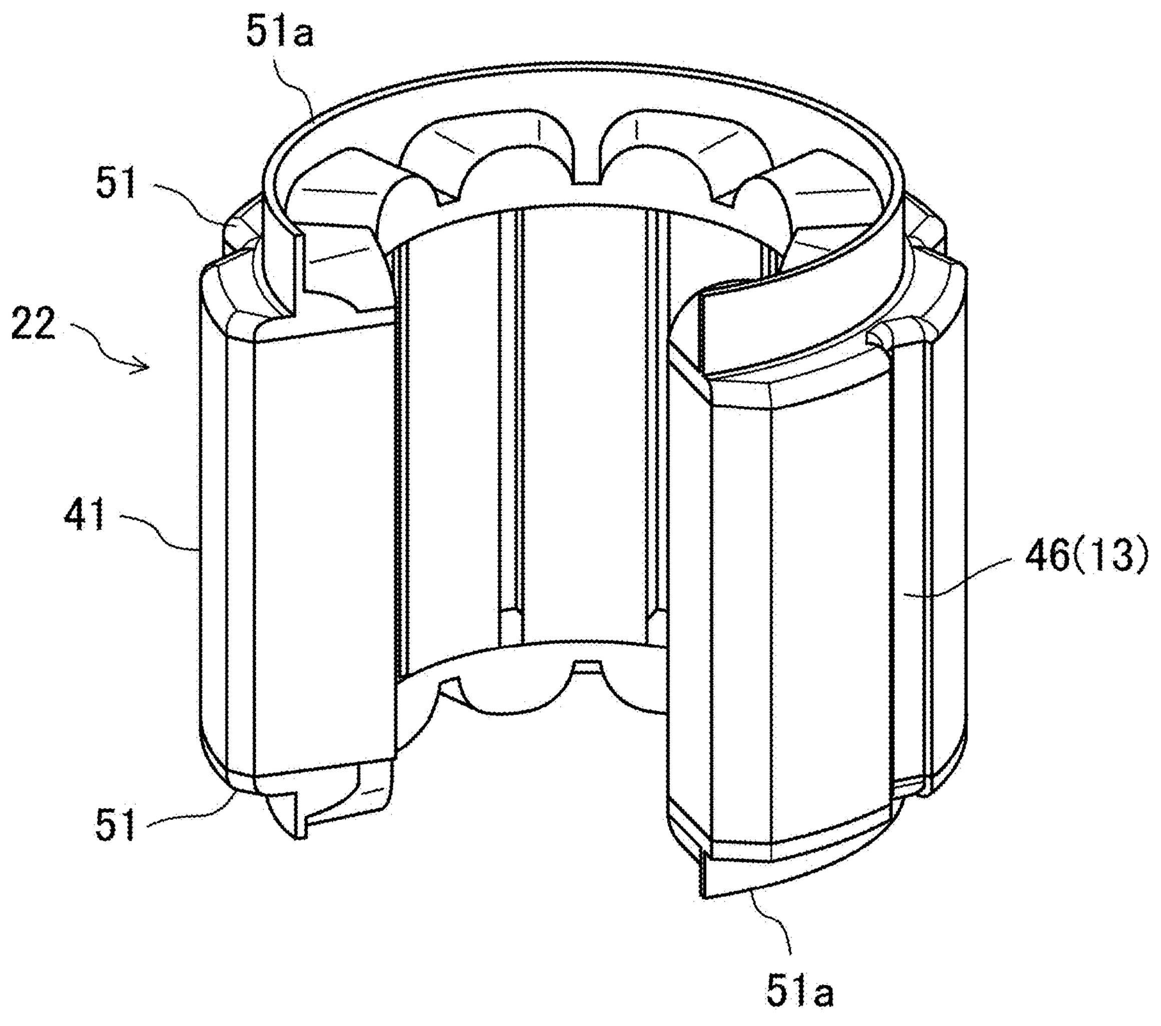
FIG. 3 is a perspective view of the stator and an insulating member of the compressor of the embodiment.

As illustrated in FIGS. 2 and 3, the stator (22) includes a stator core (41) and an insulating member (51) as main components. The stator core (41) is fitted to the inner circumferential surface of the closed container (1) by shrink fitting, for example. The stator core (41) is made of electrical steel, for example. The insulating member (51) is attached to each of the end surfaces (the upper end surface and the lower end surface) of the stator core (41) in the vertical direction. The insulating member (51) is made of resin, for example. FIG. 3 illustrates the stator (22) with the stator core (41) and the insulating members (51) partially cut out.

The stator core (41) has a ring portion (42) and a plurality of teeth (43) (nine teeth in this example). The ring portion (42) has a substantially cylindrical shape. The teeth (43) protrude radially inward from the inner circumferential surface of the ring portion (42). The teeth (43) are arranged at equal intervals in the circumferential direction of the ring portion (42). A slot (44) is formed between the teeth (43) adjacent to each other in the circumferential direction of the ring portion (42). Conductor wire is wound around each tooth (43) with an insulating sheet interposed therebetween, thereby forming a coil (45). The insulating sheet may be integrated with the insulating members (51). The insulating members (51) cover the upper and lower ends (coil ends) of the coil (45) and has a vertical wall (51*a*) that prevents displacement of the coil ends in the radial direction.

In the present disclosure, a "radial direction" is a direction orthogonal to the shaft (4); a "circumferential direction" is the circumferential direction of a circle centered on the shaft (4); and an "axial direction" is a direction along which the shaft (4) extends, that is, the "up-down direction."

Core cuts (46), which are grooves extending in the up-down direction, are formed in the outer circumferential surface of the stator core (41) (ring portion (42)). The core cuts (46) are arranged at equal intervals in the outer circumferential surface of the stator core (41). Each of the core cuts (46) serves as a passage (13) (hereinafter also referred to as a refrigerant passage (13)) through which the refrigerant gas (high-pressure refrigerant) compressed by the compression mechanism (3) moves toward the discharge pipe (12).

Insulating Member

Figure 4:
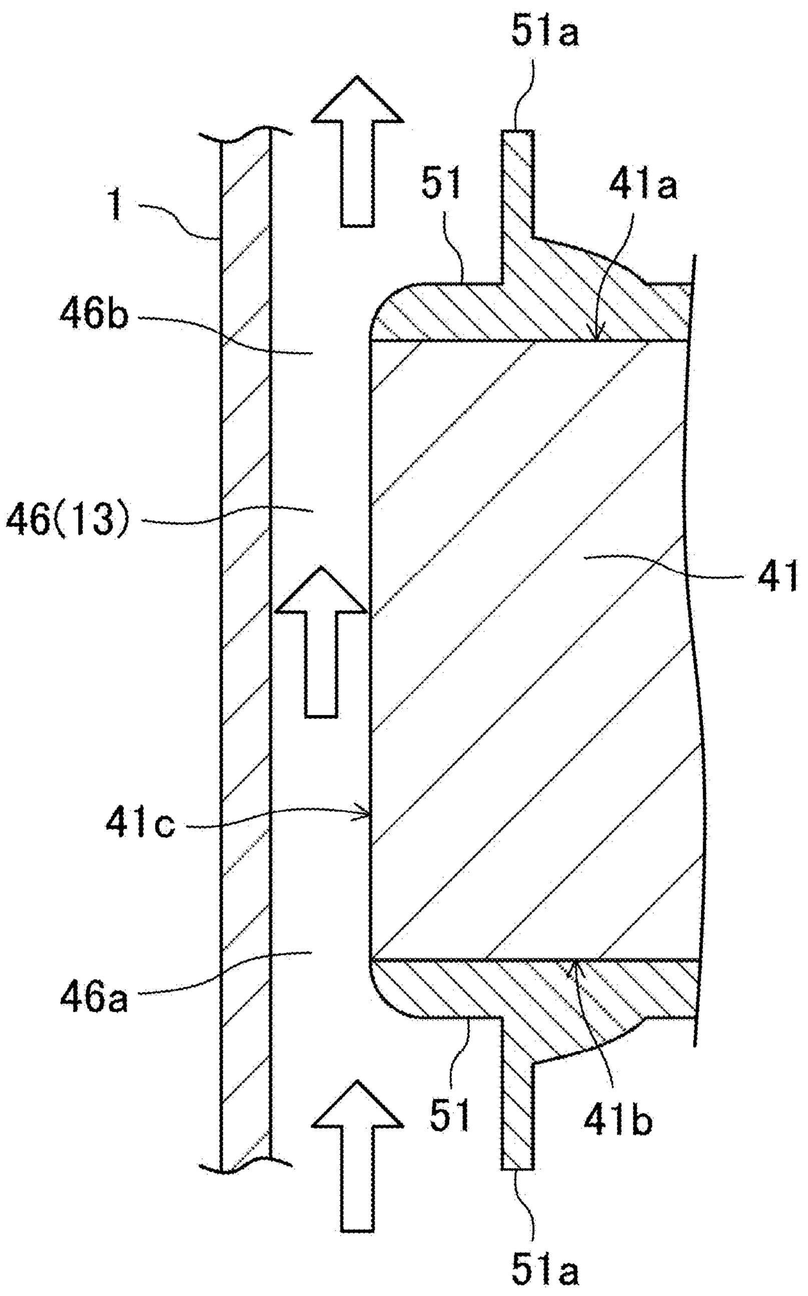
FIG. 4 is a cross-sectional view schematically illustrating a flow of a refrigerant through a core cut of the compressor of the embodiment.

As illustrated in FIGS. 2 to 4, the insulating members (51) provided at the upper end (41*a*) and the lower end (41*b*) of the stator core (41) each have a surface continuous with a sidewall surface (41*c*) of the stator core (41) provided with the core cuts (46). In other words, each of the insulating members (51) extends from the vertical wall (51*a*) to the radially outer end of the stator core (41), and the radially outer end of each of the insulating members (51) makes a smooth, continuous surface with the sidewall surface (41*c*) of the stator core (41) so that no steps are created. This configuration can reduce a sudden increase in the cross-sectional area of the refrigerant passage (13) at an inlet (46*a*) or an outlet (46*b*) of the core cut (46); it is thus possible to reduce the pressure loss (inlet loss or outlet loss) that occurs at the inlet (46*a*) or the outlet (46*b*) of the core cut (46). FIG. 4 is a cross-sectional view taken along line a-a shown in FIG. 2. In FIG. 4, the refrigerant flowing through the refrigerant passage (13) is indicated by arrows.

Figure 5A:
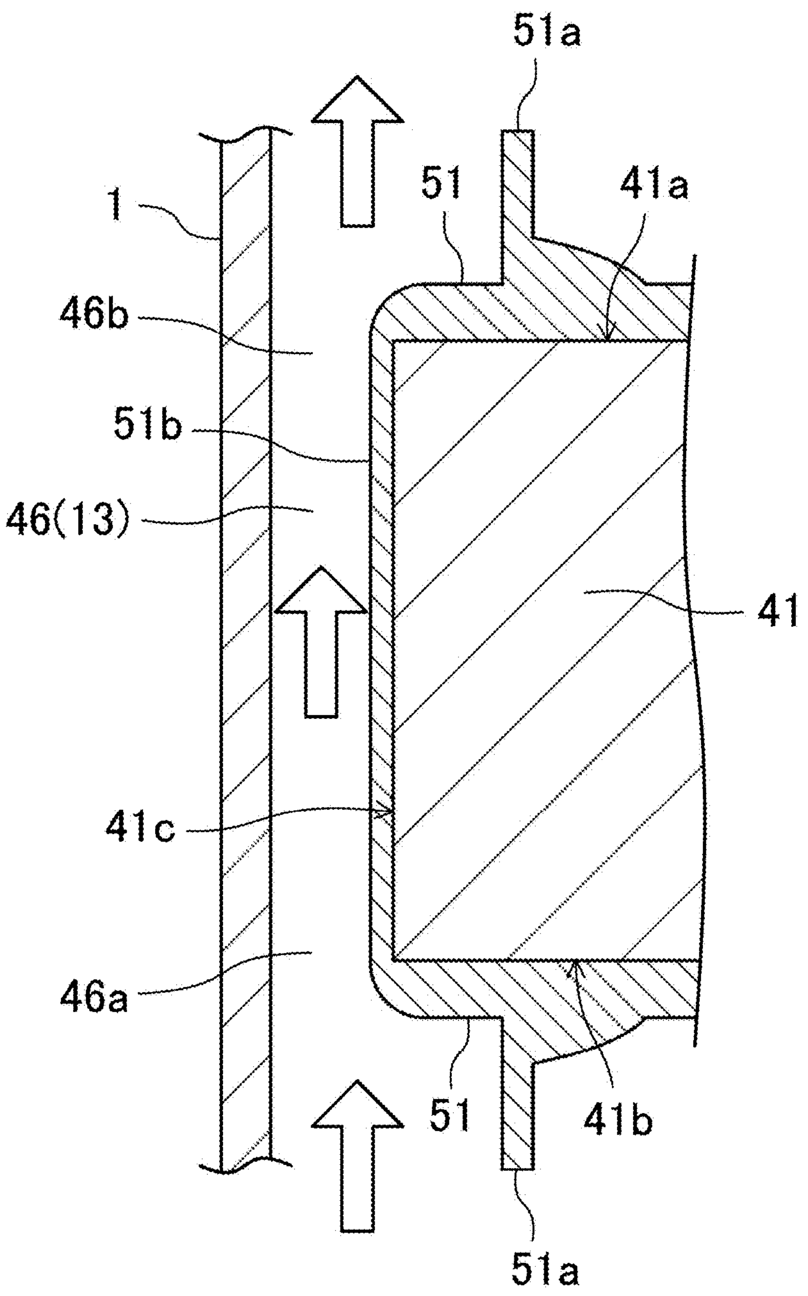
FIG. 5A is a cross-sectional view schematically illustrating a flow of a refrigerant through a core cut in an example configuration in which an insulating member is provided for a sidewall surface of a stator core of the compressor of the embodiment.

As illustrated in FIG. 5A, the insulating member (51) may have a cover (51*b*) covering the sidewall surface (41*c*) of the stator core (41) provided with the core cuts (46). In this example, the cover (51*b*) connects between the insulating members (51) provided at the upper end (41*a*) and the lower end (41*b*) of the stator core (41). In other words, the cover (51*b*) covers the entirety of the sidewall surface (41*c*) of the stator core (41) provided with the core cuts (46) in the up-down direction. The cover (51*b*) may connect with one of the insulating members (51) provided at the upper end (41*a*) or the lower end (41*b*) of the stator core (41). In other words, the cover (51*b*) may cover part of the sidewall surface (41*c*) of the stator core (41) provided with the core cuts (46) in the up-down direction.

The insulating member (51) illustrated in FIG. 5A has the same effect as the insulating members (51) illustrated in FIG. 4 as long as the surface of the insulating member (51) located at the upper end (41*a*) or the lower end (41*b*) of the stator core (41) is continuous with the surface of the cover (51*b*).

Figure 5B:
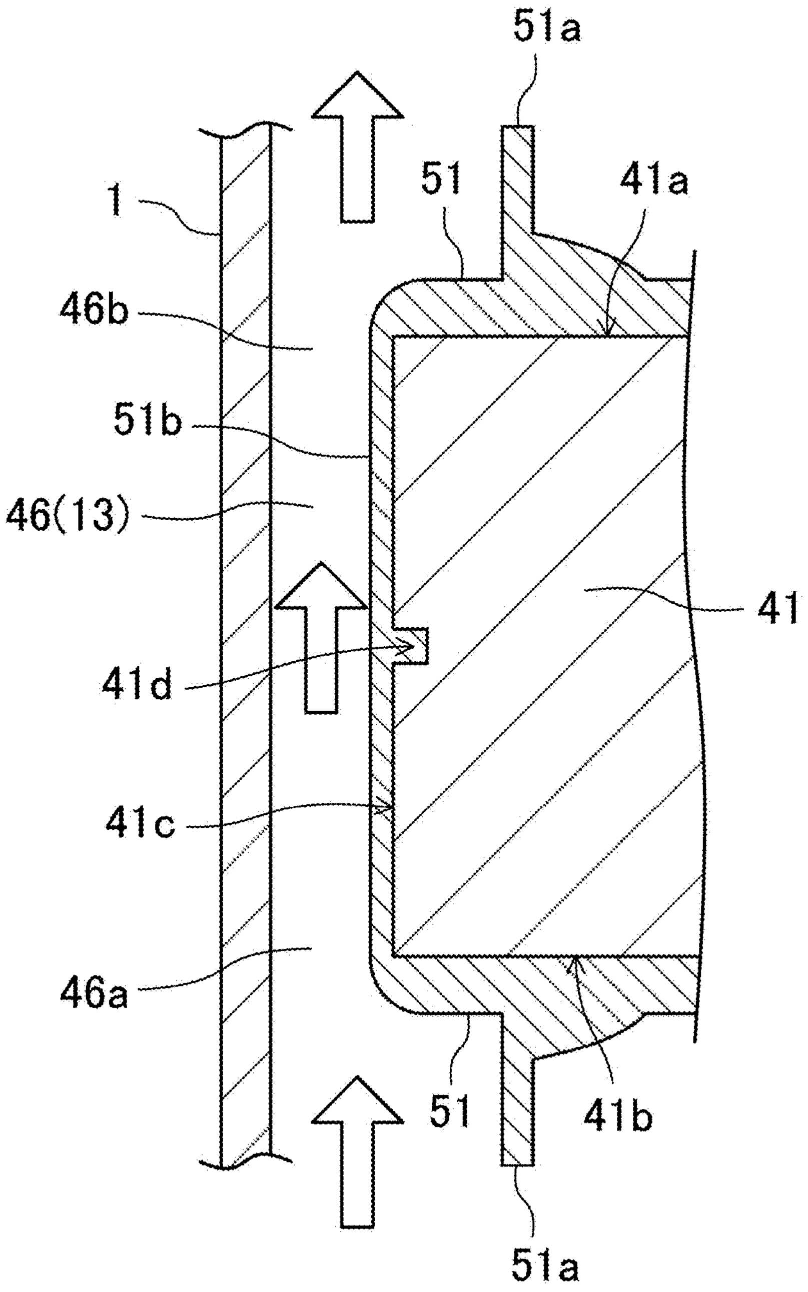
FIG. 5B is a cross-sectional view schematically illustrating a flow of a refrigerant through a core cut in another example configuration in which an insulating member is provided for a sidewall surface of a stator core of the compressor of the embodiment.

As illustrated in FIG. 5B, if there is a step (41*d*) in the sidewall surface (41*c*) of the stator core (41) provided with the core cuts (46), the cover (51*b*) may be provided to fill the step (41*d*). This configuration can reduce changes in the cross-sectional area of the refrigerant passage (13) due to the step (41*d*) between the sidewall surface (41*c*) of the stator core (41) and the inner wall of the closed container (1); it is thus possible to reduce the pressure loss (enlargement loss or contraction loss).

It is preferable, for all the insulating members (51) illustrated in FIGS. 4, 5A, and 5B, that the position of the radially outer end (outer circumferential end) of the insulating member (51) is continuously retracted to the radially inner side with an increasing distance from the stator core (41) in order to reduce a sudden change in the cross-sectional area of the refrigerant passage (13) at the inlet (46*a*) or the outlet (46*b*) of the core cut (46). Specifically, the outer circumferential end of the insulating member (51) is preferably R-shaped or chamfered at the inlet (46*a*) or the outlet (46*b*) of the core cut (46). It is thus possible to further reduce the pressure loss (inlet loss or outlet loss) that occurs at the inlet (46*a*) or the outlet (46*b*) of the core cut (46).

Comparative Example

Figure 6A:
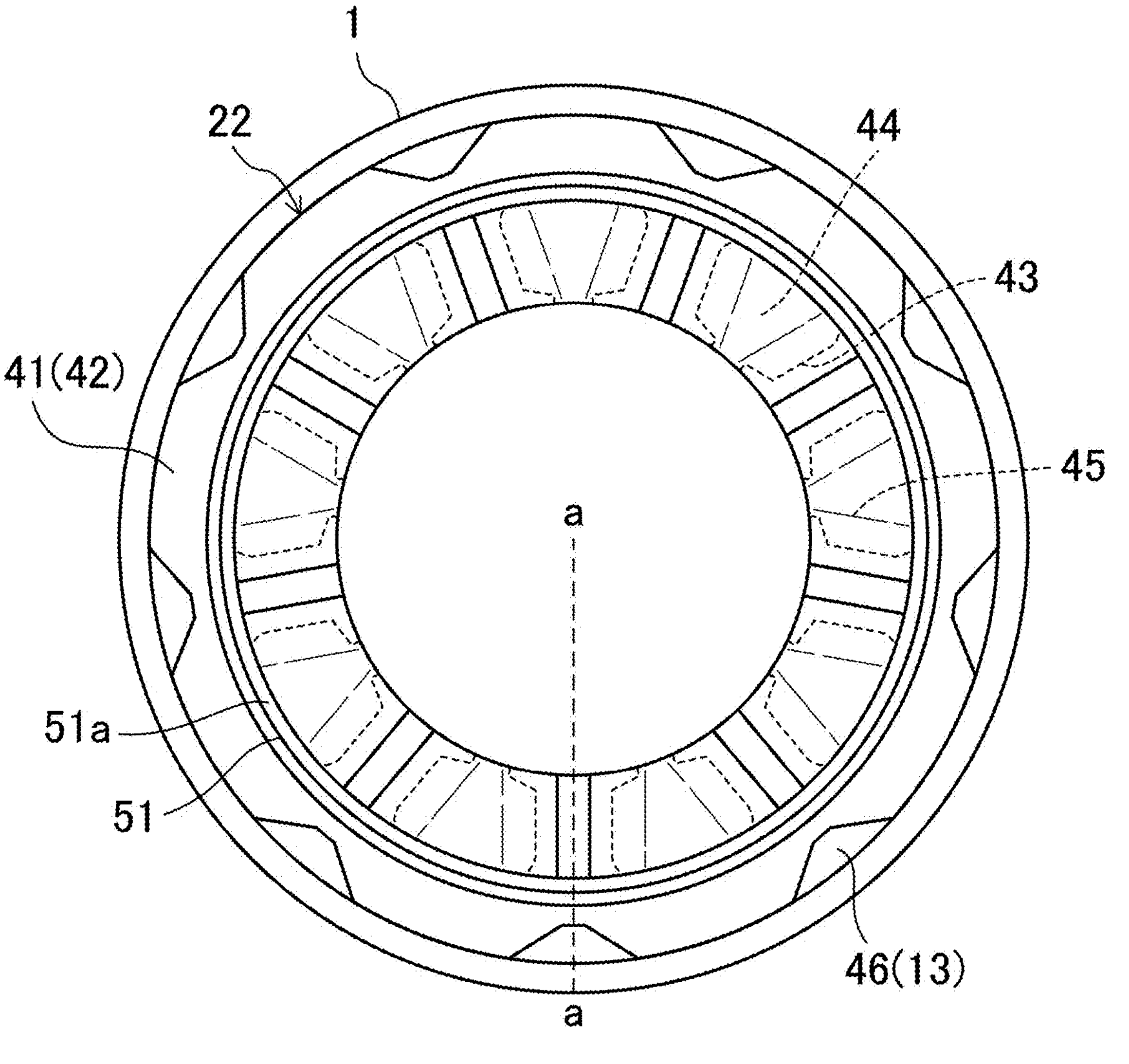
FIG. 6A is a cross-sectional view illustrating an arrangement configuration of a closed container and a stator of a compressor of a comparative example.
Figure 6B:
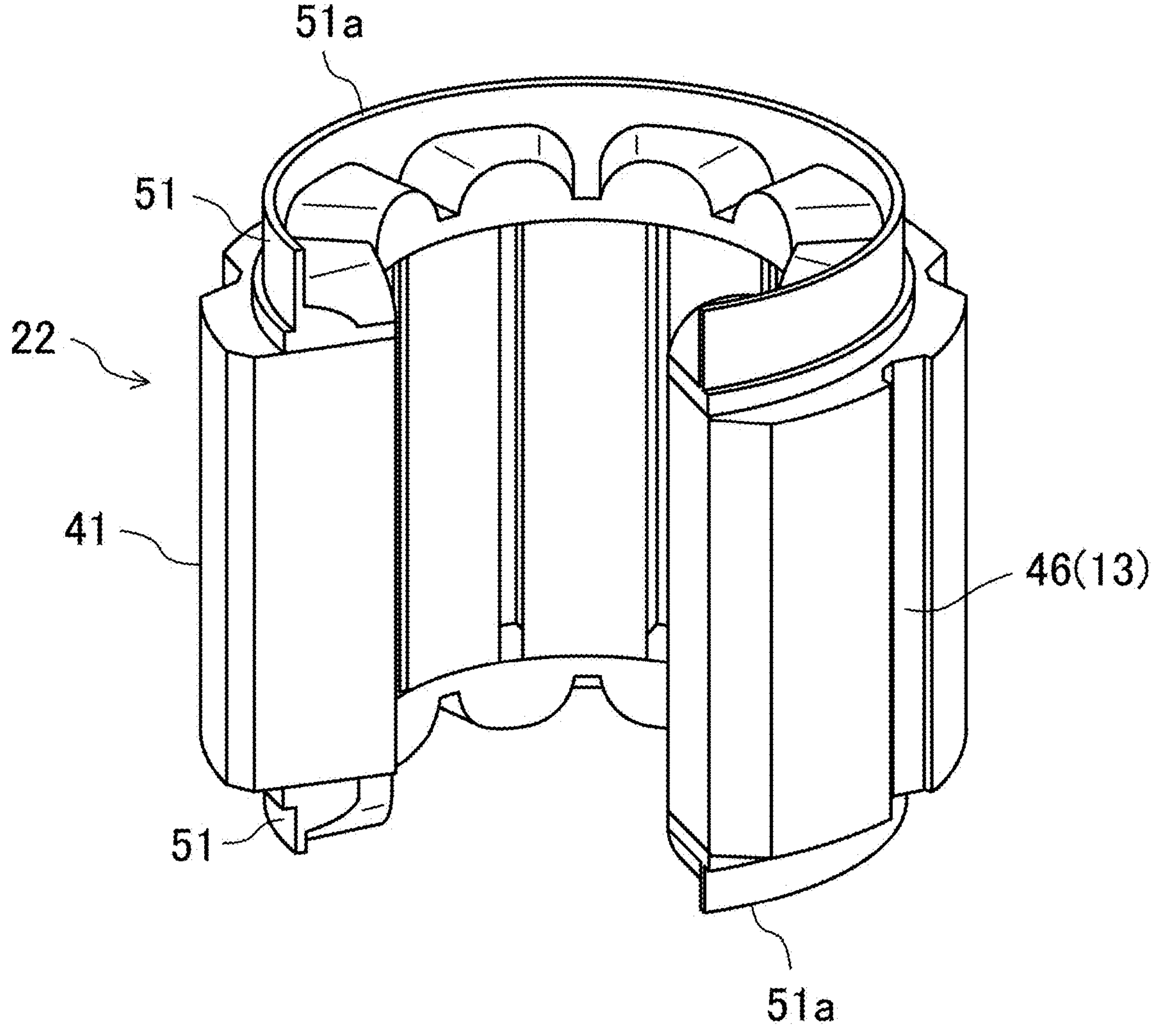
FIG. 6B is a perspective view of a stator and an insulating member of the compressor of the comparative example.
Figure 7:
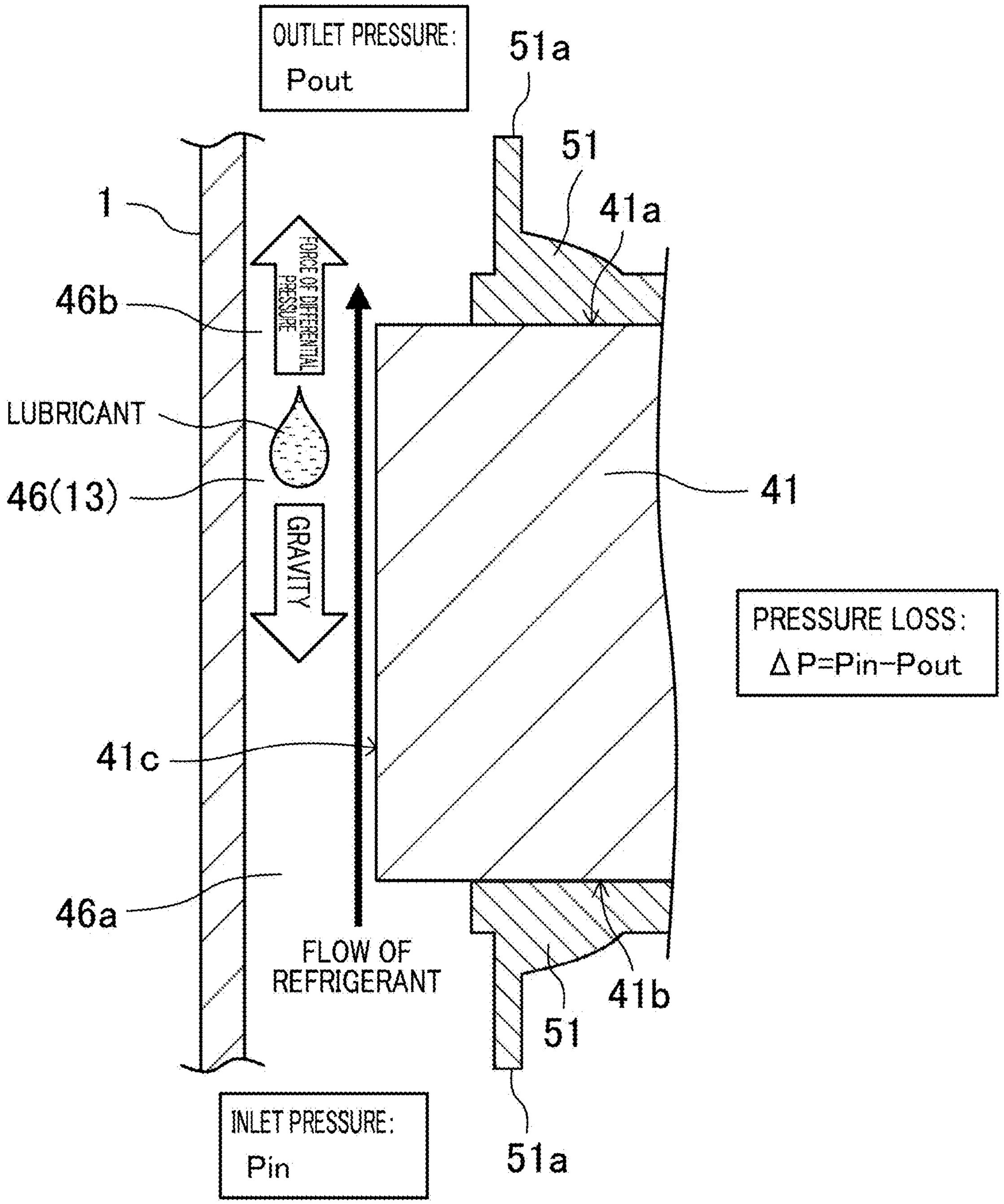
FIG. 7 is a cross-sectional view schematically illustrating a flow of a refrigerant through a core cut of the compressor of the comparative example.

As illustrated in FIGS. 6A, 6B, and 7, the insulating members (51) of a compressor according to a comparative example differ in the shape from the insulating members (51) of the embodiments illustrated in FIGS. 2 to 4 and FIGS. 5A and 5B. In FIGS. 6A, 6B, and 7, the same reference characters are used to designate the same elements as those of the compressor (10) of the above embodiments.

Specifically, in the comparative example, the outer circumferential end of the insulating member (51) at the upper end (41*a*) or the lower end (41*b*) of the stator core (41) is apart from the sidewall surface (41*c*) of the stator core (41). Accordingly, there is a sudden change in the cross-sectional area of the refrigerant passage (13) at the inlet (46*a*) or the outlet (46*b*) of the core cut (46) in the comparative example, resulting in the pressure loss (inlet loss or outlet loss) at the inlet (46*a*) or the outlet (46*b*) of the core cut (46).

Mechanisms by which the rate of oil loss increases in the comparative example due to the pressure loss will be described below with reference to FIG. 7. In the comparative example, too, the compression mechanism is arranged in the space below the motor, and the refrigerant flows from the inlet (46*a*) to the outlet (46*b*) of the core cut (46).

The pressure at the inlet (46*a*) of the core cut (46) (inlet pressure) is referred to as Pin, and the pressure at the outlet (46*b*) of the core cut (46) (outlet pressure) is referred as Pout. The outlet pressure Pout decreases due to pressure loss, generating a differential pressure $\Delta P = Pin - Pout$.

Gravity (own weight) acts on the lubricant that has flowed through the refrigerant passage (13) together with the refrigerant and has been carried into the space above the motor; thus, if the differential pressure ΔP is small, the lubricant returns to the space below the motor and is used to lubricate the sliding portions of the compression mechanism (3).

However, if the differential pressure ΔP increases due to the pressure loss, a force of the differential pressure that pushes back the lubricant upward becomes larger than the weight of the lubricant itself, which deteriorates the oil return performance to the space below the motor and increases the rate of oil loss. On the other hand, if the core cut (46) is increased in size to reduce the pressure loss, a problem arises that the motor performance decreases.

Evaluation Index of Pressure Loss

The magnitude of the pressure loss that occurs in the core cut (46) can be calculated by using a formula of $(\zeta 1+\zeta 2+\zeta 3+\zeta 4+\zeta 5)\cdot(\rho d\cdot v^2/2)$, for example. Here, ζ1 is a pressure loss coefficient in the core cut stack thickness; ζ2 is an inlet loss coefficient; ζ3 is an outlet loss coefficient; ζ4 is an enlargement loss coefficient, and ζ5 is a contraction loss coefficient. ζ1 can be calculated using the formula of $0.3164/Re^{-0.25}\cdot L/D$. ζ2 to ζ5 are calculated experimentally.

Re is the Reynolds number and can be calculated using a formula of $Re=\rho d\cdot v\cdot L/\mu$, and v is the refrigerant gas flow velocity (m/s) and can be calculated using a formula of $v=Vcc\cdot rps\cdot \rho s/S$. In the formulas, ρd is a discharged refrigerant gas density (kg/m$^3$); L is a core cut stack thickness (length of the core cut in the up-down direction) (m); D is a core cut hydraulic diameter (m); μ is a refrigerant viscosity (kg/m·s); Vcc is a cylinder volume (m$^3$) of the compression mechanism; rps is the maximum number of revolutions of operation (maximum number of revolutions) (l/s); ρs is a sucked gas density (kg/m$^3$); and S is a core cut cross-sectional area (m$^2$). The core cut cross-sectional area S is the sum of the cross-sectional areas of all the core cuts, and is an average cross-sectional area if the cross-sectional area of the core cut varies in the up-down direction.

The discharged refrigerant gas density ρd (kg/m$^3$) is calculated by REFPROP, using the pressure on the high-pressure side and the discharged refrigerant gas temperature determined by the operating conditions (such as a condensation temperature Tc; an evaporation temperature Te; a degree of superheat Sh; and a degree of subcooling Sc). REFPROP is software developed by the National Institute of Standards and Technology for calculating the thermal properties and transport properties of fluids.

The gas flow velocity v (m/s) is calculated from the circulation amount of the refrigerant (the circulation amount during operation at the maximum number of revolutions) F (kg/hr), the discharged refrigerant gas density ρd (kg/m$^3$), and the core cut cross-sectional area S (m$^2$), using a formula of $v=F/3600/\rho d/S$.

The circulation amount F (kg/hr) of the refrigerant is calculated from the maximum number of revolutions rps (l/s) of operation, the displacement amount (the cylinder volume (m$^3$) of the compression mechanism converted into the unit (cm$^3$)) Vcc (cm$^3$), and the sucked gas density ρs (kg/m$^3$), using a formula of $F=rps\cdot 3600\cdot Vcc/1000000\cdot \rho s$.

As the sucked refrigerant gas density ρs (kg/m$^3$), a value calculated by REFPROP using the pressure on the low-pressure side and the sucked refrigerant gas temperature determined by the above-mentioned operating conditions is used.

As the refrigerant viscosity μ (kg/m·s), a value calculated by REFPROP using the pressure on the high-pressure side and the discharged refrigerant gas temperature is used, similarly to the discharged refrigerant gas density ρd.

As it is clear from the above-described formulas of the pressure loss, when the capacity of the compressor is increased and the stack thickness L and the cylinder volume Vcc are increased, the pressure loss increases even if the other conditions are the same.

Figure 8:
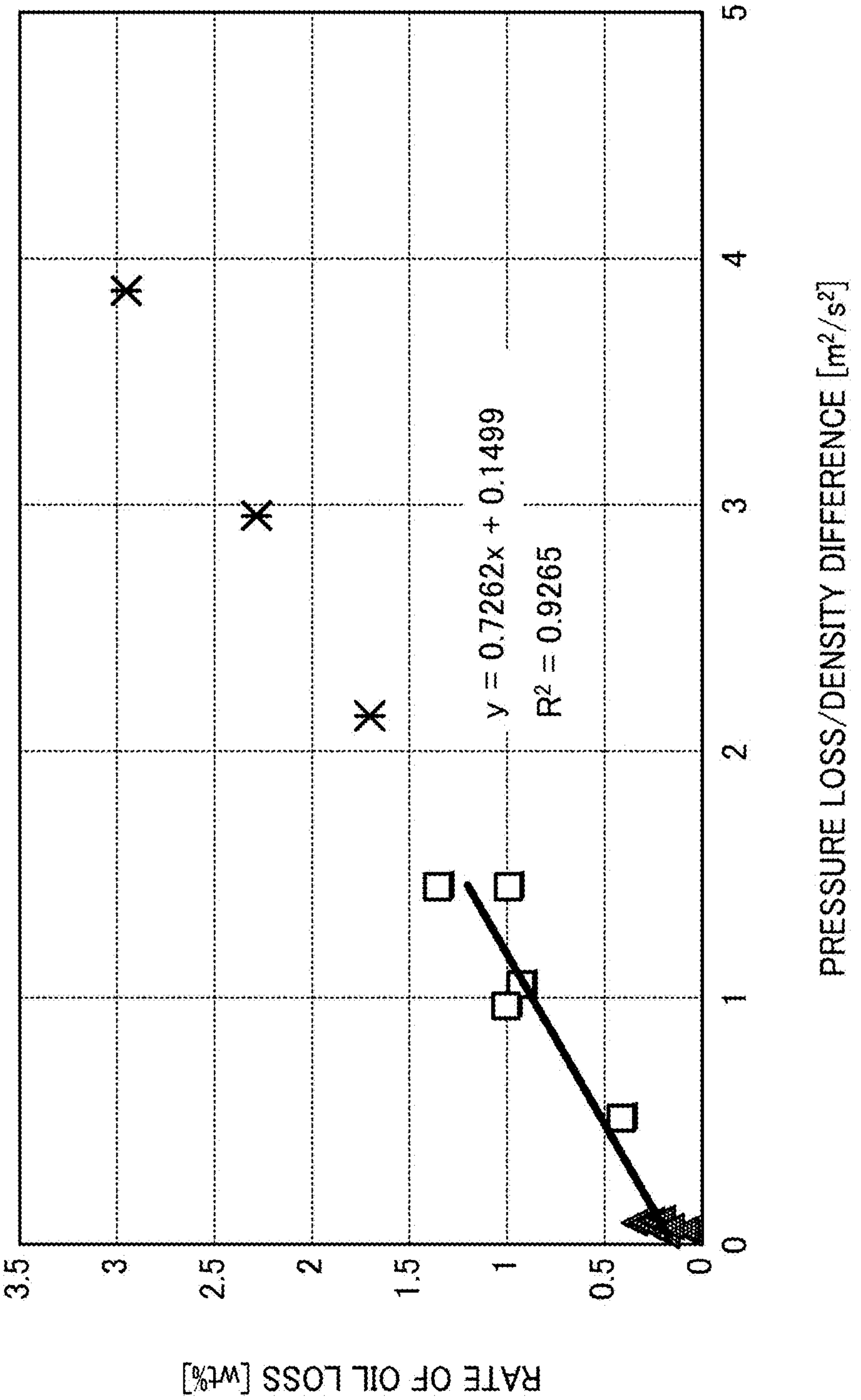
FIG. 8 is a diagram showing results of the study by the inventor of the present application on the relationship between the ratio of the pressure loss in the core cut to the density difference between the refrigerant and a lubricant, and the rate of oil loss.

Based on the formulas of the pressure loss explained above, the inventor of the present application calculated the ratio of pressure loss (pressure loss that occurs between the inlet and outlet of the core cut) to the "difference between the gas density of the refrigerant and the density of the lubricant" as an evaluation index of the pressure loss for various types of existing compressors and virtual large-capacity compressors, and examined the relationship between said ratio and the rate of oil loss. FIG. 8 shows the results. In FIG. 8, Δ indicates the evaluation result of an existing one-cylinder compressor; □ indicates the evaluation result of an existing two-cylinder compressor, and * indicates the evaluation result of the virtual large-capacity compressor. The gas density of the refrigerant is the discharged refrigerant gas density ρd described above. The density d (kg/m$^3$) of the lubricant is calculated using a formula of $d=0.93-0.00073\cdot(T-15)\cdot 1000$, where T (° C.) is the discharged refrigerant gas temperature. The rate of oil loss indicates a ratio of the lubricant that does not return from the space above the motor to the total amount of the lubricant. In all the compressors, carbon dioxide was used as the refrigerant. For the virtual large-capacity compressor, a trial calculation was made, assuming that the cross-sectional area of the core cut serving as a refrigerant passage was constant from the inlet to the outlet in the configuration of the comparative example described above.

As shown in FIG. 8, the rate of oil loss increases as the above-mentioned ratio (hereinafter, referred to as "pressure loss/density difference") increases: a linear relationship was observed between the "pressure loss/density difference" and the rate of oil loss, including the evaluation result of the virtual large-capacity compressors.

Figure 9:
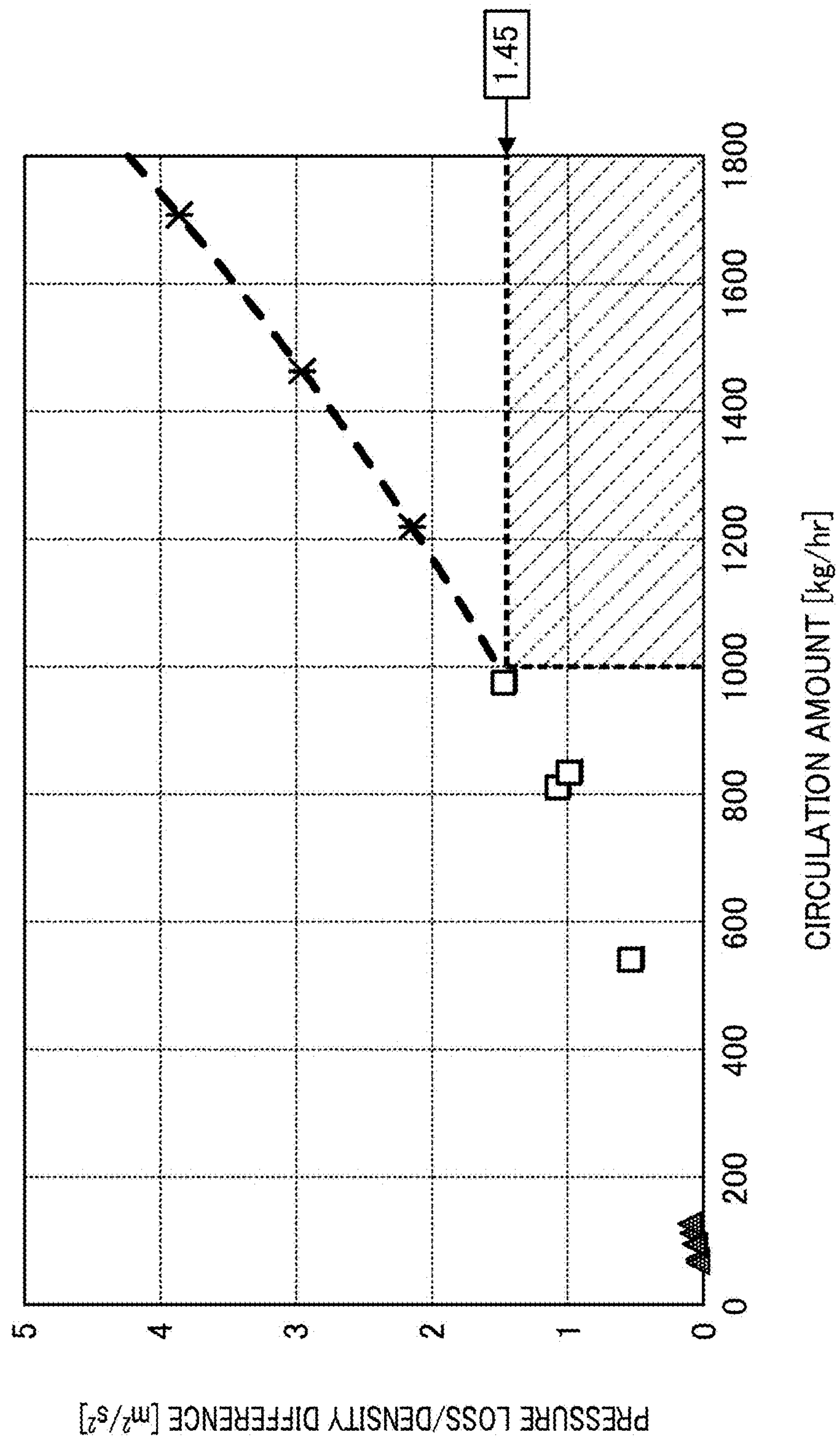
FIG. 9 is a diagram showing results of the study by the inventor of the present application on the relationship between the circulation amount in the compressor and the ratio of the pressure loss in the core cut to the density difference between the refrigerant and a lubricant.

The inventor of the present application then investigated the relationship between the circulation amounts and the "pressure loss/density difference" for the various types of compressors shown in FIG. 8. FIG. 9 shows the results. As shown in FIG. 9, it was found that, in the configuration of the above comparative example, the "pressure loss/density difference" increases as the circulation amount F increases to the capacity of 1000 (kg/hr) or more.

From the results shown in FIGS. 8 and 9, the inventor of the present application found that, even when a large-capacity compressor has a circulation amount F of 1000 (kg/hr) or more, it was possible, similarly to the existing compressors, to reduce an increase in the rate of oil loss associated with an increase in the capacity, if the "pressure loss/density difference" can be kept at 1.45 or less. It is possible to keep the "pressure loss/density difference" from increasing by, for example, modifying the shape of the insulating member (51) as illustrated in the embodiments shown in FIGS. 2 to 4, 5A and 5B.

The inventor of the present invention also found that it was possible to reduce the degradation of the motor performance by setting the core cut cross-sectional area S so as to satisfy $S \leq 0.00215 \times (F/1000)^{7/9}$, where S ($m^2$) is the core cut cross-sectional area, and F (kg/hr) (>1000 (kg/hr)) is the circulation amount. Here, the coefficient 0.00215 is the core cut cross-sectional area when the "pressure loss/density difference" is 1.45 in an actual machine having a circulation amount of 1000 (kg/hr). That is, the degradation of the motor performance may be reduced by keeping the increase rate of the core cut cross-sectional area S smaller than the increase rate of the circulation amount F.

Features of Embodiments

As described above, the compressor (10) of the present embodiment includes the closed container (1), the motor (2), and the compression mechanism (3), and has a circulation amount of 1000 (kg/hr) or more in an operation at the maximum number of revolutions. The motor (2) is arranged in the closed container (1). The motor (2) has the rotor (21) on the shaft (4) extending in the up-down direction and the stator (22) fixed to the closed container (1). The compression mechanism (3) is arranged below the motor (2) in the closed container (1). The compression mechanism (3) is driven by the motor (2) and compresses a refrigerant. The stator (22) includes the stator core (41) provided with the core cut (46) serving as a passage (13) of the refrigerant between the inner wall of the closed container (1) and the stator (22).

In the compressor (10) of the present embodiment, (the pressure loss that occurs between the inlet (46*a*) and the outlet (46*b*) of the core cut (46))/(the gas density of the refrigerant−the density of the lubricant), that is, the "pressure loss/density difference" is set to 1.45 or less. It is thus possible to reduce the differential pressure between the lower space and the upper space of the motor (2), while reducing an increase in size of the core cut (46). Accordingly, even when the compressor (10) has a larger capacity, the lubricant easily returns to the lower space of the motor (2); it is thus possible to reduce an increase in the rate of oil loss without degradation of the performance of the motor (2).

In the compressor (10) of the present embodiment, the cross-sectional area of the core cut (46) is referred to as S ($m^2$) and the circulation amount is referred to as F (kg/hr) (>1000 (kg/hr)), and $S \leq 0.00215 \times (F/1000)^{7/9}$ may be satisfied. According to this formula, when the circulation amount F of the compressor (10) is increased (i.e., when the compressor (10) has a larger capacity), the increase rate of the cross-sectional area S of the core cut (46) is kept smaller than the increase rate of the circulation amount F; it is thus possible to reduce the degradation of the performance of the motor (2). It is also possible to reduce the amount of cut from the stator core (41) to form the core cut (46) and facilitate machining.

In the compressor (10) of the present embodiment, at least one of the upper end (41*a*) or the lower end (41*b*) of the stator core (41) may be provided with the insulating member (51) having a surface continuous with the sidewall surface (41*c*) of the stator core (41) provided with the core cuts (46). This configuration can reduce a sudden increase in the cross-sectional area of the refrigerant passage (13) at the inlet (46*a*) or the outlet (46*b*) of the core cut (46); it is thus possible to reduce the pressure loss (inlet loss or outlet loss) that occurs at the inlet (46*a*) or the outlet (46*b*) of the core cut (46).

In the compressor (10) of the present embodiment, the insulating member (51) may be provided which covers at least one of the upper end (41*a*) or the lower end (41*b*) of the stator core (41) and part or entirety of the sidewall surface (41*c*) of the stator core (41) provided with the core cuts (46). According to this configuration, it is possible to fill a step in the sidewall surface (41*c*) of the stator core (41) provided with the core cuts (46) with the insulating member (51). This configuration can reduce changes in the cross-sectional area of the refrigerant passage (13) between the sidewall surface (41*c*) of the stator core (41) and the inner wall of the closed container (1); it is thus possible to reduce the pressure loss (enlargement loss or contraction loss).

In the compressor (10) of the present embodiment, the position of the radially outer end of the insulating member (51) is continuously retracted to the radially inner side with an increasing distance from the stator core (41). This configuration can further reduce a sudden increase in the cross-sectional area of the refrigerant passage (13) at the inlet (46*a*) or the outlet (46*b*) of the core cut (46); it is thus possible to further reduce the pressure loss (inlet loss or outlet loss) that occurs at the inlet (46*a*) or the outlet (46*b*) of the core cut (46).

OTHER EMBODIMENTS

In the above embodiment, the rotary compressor (10) illustrated in FIG. 1 is shown as an example of the compressor, and the motor (2) illustrated in FIGS. 2 and 3 is shown as an example of the motor. However, the compressor and the motor are not limited thereto. The technology described in the above embodiment is applicable to any compressor which has a circulation amount of 1000 (kg/hr) or more in the operation at the maximum number of revolutions, the compression mechanism of which is arranged below the motor in the closed container, and which has a stator core provided with a core cut serving as a passage of the refrigerant between the inner wall of the closed container and the stator.

In the above embodiment, the insulating members (51) are used at both the inlet (46*a*) and the outlet (46*b*) of the core cut (46) to form a gentle shape for reducing a sudden change in the cross-sectional area of the refrigerant passage (13). However, such a gentle shape may be provided only at one of the inlet (46*a*) or the outlet (46*b*) of the core cut (46).

Such a gentle shape may be achieved by means other than the insulating member (51), for example, by the shape of the stator core (41) itself.

While the embodiments have been described above, it will be understood that various changes in form and details can be made without departing from the spirit and scope of the claims. The above-described embodiments and variations may be appropriately combined or replaced.

As described above, the present disclosure is useful for a compressor, particularly a compressor having a circulation amount of 1000 (kg/hr) or more in the operation at the maximum number of revolutions.

The invention claimed is:

1. A compressor comprising:
a closed container;
a motor having
a rotor arranged in the closed container and provided on a shaft extending in an up-down direction, and
a stator fixed to the closed container; and
a compression mechanism arranged below the motor in the closed container and configured to be driven by the motor to compress a refrigerant,
the compressor having a circulation amount of 1000 kg/hr or more in an operation at a maximum number of revolutions,
the stator including a stator core provided with a core cut serving as a passage of the refrigerant between an inner wall of the closed container and the stator,
the compressor being configured such that a ratio A/B equals 1.45 or less, where A is a pressure loss that occurs between an inlet and an outlet of the core cut and B is a difference obtained by subtracting a density of a lubricant from a gas density of the refrigerant,
at least one of an upper end and a lower end of the stator core being provided with an insulating member having a surface continuous with a sidewall surface of the stator core provided with the core cut.

2. The compressor of claim 1, wherein
a relationship $S<0.00215\times(F/1000)^{7/9}$ is satisfied,
S being a cross-sectional area of the core cut in $m^2$ and F being the circulation amount in kg/hr.

3. A compressor comprising:
a closed container;
a motor having
a rotor arranged in the closed container and provided on a shaft extending in an up-down direction, and
a stator fixed to the closed container; and
a compression mechanism arranged below the motor in the closed container and configured to be driven by the motor to compress a refrigerant,
the compressor having a circulation amount of 1000 kg/hr or more in an operation at a maximum number of revolutions,
the stator including a stator core provided with a core cut serving as a passage of the refrigerant between an inner wall of the closed container and the stator,
the compressor being configured such that a ratio A/B equals 1.45 or less, where A is a pressure loss that occurs between an inlet and an outlet of the core cut and B is a difference obtained by subtracting a density of a lubricant from a gas density of the refrigerant,
an insulating member covering
at least one of an upper end and a lower end of the stator core and
part or an entirety of a sidewall surface of the stator core provided with the core cut.

4. The compressor of claim 1, wherein
a position of a radially outer end of the insulating member is continuously retracted to a radially inner side with an increasing distance from the stator core.

5. The compressor of claim 3, wherein
a position of a radially outer end of the insulating member is continuously retracted to a radially inner side with an increasing distance from the stator core.

6. The compressor of claim 3, wherein
a relationship $S\leq 0.00215\times(F/1000)^{7/9}$ is satisfied,
S being a cross-sectional area of the core cut in $m^2$ and F being the circulation amount in kg/hr.

* * * * *